(12) United States Patent
Maher et al.

(10) Patent No.: US 12,332,376 B2
(45) Date of Patent: Jun. 17, 2025

(54) METHOD AND SYSTEM FOR MULTI-CHIP OPERATION OF RADAR SYSTEMS

(71) Applicant: UHNDER, INC., Austin, TX (US)

(72) Inventors: Monier Maher, St. Louis, MO (US); Arunesh Roy, San Jose, CA (US); Murtaza Ali, Cedar Park, TX (US); Jean Pierre Bordes, St. Charles, MO (US); Curtis Davis, St. Louis, MO (US)

(73) Assignee: Uhnder, Inc., Austin, TX (US)

( * ) Notice: Subject to any disclaimer, the term of this patent is extended or adjusted under 35 U.S.C. 154(b) by 0 days.

(21) Appl. No.: 18/439,191

(22) Filed: Feb. 12, 2024

(65) Prior Publication Data

US 2024/0183941 A1 Jun. 6, 2024

Related U.S. Application Data

(63) Continuation of application No. 17/147,960, filed on Jan. 13, 2021, now Pat. No. 11,899,126.
(Continued)

(51) Int. Cl.
*G01S 7/35* (2006.01)
*G01S 7/02* (2006.01)
(Continued)

(52) U.S. Cl.
CPC ............ *G01S 7/352* (2013.01); *G01S 7/023* (2013.01); *G01S 7/4004* (2013.01); *G01S 13/34* (2013.01);
(Continued)

(58) Field of Classification Search
CPC ........ G01S 7/352; G01S 7/023; G01S 7/4004; G01S 13/34; G01S 13/584; G01S 13/588;
(Continued)

(56) References Cited

U.S. PATENT DOCUMENTS

| 1,882,128 A | 10/1932 | Fearing |
| 3,374,478 A | 3/1968 | Blau |

(Continued)

FOREIGN PATENT DOCUMENTS

| EP | 0509843 | 10/1992 |
| EP | 1826586 | 8/2007 |

(Continued)

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Nuzhat Pervin
(74) *Attorney, Agent, or Firm* — Gardner, Linn, Burkhart & Ondersma LLP

(57) ABSTRACT

A multi-chip MIMO radar system includes a plurality of transmitters and a plurality of receivers. Each of the pluralities of transmitters and receivers are arranged across a plurality of circuit chips. The multi-chip MIMO radar system includes a central processor configured to receive data from the plurality of circuit chips. The plurality of circuit chips generates sets of selected range, Doppler, and virtual receiver data. The central processor is operable to process the sets of selected range, Doppler, and virtual receiver data to produce selected range detection and angular resolvability of targets.

19 Claims, 9 Drawing Sheets

Related U.S. Application Data

(60) Provisional application No. 62/960,220, filed on Jan. 13, 2020.

(51) Int. Cl.

| | |
|---|---|
| *G01S 7/28* | (2006.01) |
| *G01S 7/32* | (2006.01) |
| *G01S 7/40* | (2006.01) |
| *G01S 13/34* | (2006.01) |
| *G01S 13/36* | (2006.01) |
| *G01S 13/42* | (2006.01) |
| *G01S 13/58* | (2006.01) |
| *G01S 13/87* | (2006.01) |
| *G01S 13/931* | (2020.01) |
| *H01Q 3/26* | (2006.01) |

(52) U.S. Cl.
CPC .......... *G01S 13/584* (2013.01); *G01S 13/588* (2013.01); *G01S 13/931* (2013.01); *H01Q 3/267* (2013.01); *G01S 7/28* (2013.01); *G01S 7/32* (2013.01); *G01S 7/356* (2021.05); *G01S 13/36* (2013.01); *G01S 13/42* (2013.01); *G01S 13/878* (2013.01); *G01S 2013/93271* (2020.01); *G01S 2013/93272* (2020.01)

(58) Field of Classification Search
CPC ......... G01S 13/931; G01S 2013/93271; G01S 2013/93272; G01S 7/356; G01S 7/28; G01S 7/32; G01S 13/36; G01S 13/42; G01S 13/878; H01Q 3/267
USPC ........................................................ 342/107
See application file for complete search history.

(56) References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,766,554 A | 10/1973 | Tresselt | |
| 3,896,434 A | 7/1975 | Sirven | |
| 3,932,871 A | 1/1976 | Foote | |
| 4,078,234 A | 3/1978 | Fishbein et al. | |
| 4,176,351 A | 11/1979 | De Vita et al. | |
| 4,308,536 A | 12/1981 | Sims, Jr. et al. | |
| 4,566,010 A | 1/1986 | Collins | |
| 4,612,547 A | 9/1986 | Itoh | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,012,254 A | 4/1991 | Thompson | |
| 5,034,906 A | 7/1991 | Chang | |
| 5,087,918 A | 2/1992 | May et al. | |
| 5,140,331 A | 8/1992 | Aulenbacher et al. | |
| 5,170,331 A | 8/1992 | Aulenbacher et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,361,072 A | 11/1994 | Barrick et al. | |
| 5,376,939 A | 12/1994 | Urkowitz | |
| 5,379,322 A | 1/1995 | Kosaka et al. | |
| 5,436,872 A | 7/1995 | Gilmour et al. | |
| 5,497,162 A | 3/1996 | Kaiser | |
| 5,508,706 A | 4/1996 | Tsou et al. | |
| 5,581,464 A | 12/1996 | Woll et al. | |
| 5,654,715 A | 8/1997 | Hayashikura et al. | |
| 5,657,021 A | 8/1997 | Ehsani-Nategh et al. | |
| 5,657,023 A | 8/1997 | Lewis et al. | |
| 5,682,605 A | 10/1997 | Salter | |
| 5,691,724 A | 11/1997 | Aker et al. | |
| 5,712,640 A | 1/1998 | Andou | |
| 5,724,041 A | 3/1998 | Inoue et al. | |
| 5,847,661 A | 12/1998 | Ricci | |
| 5,861,834 A | 1/1999 | Sauer et al. | |
| 5,892,477 A | 4/1999 | Wehling | |
| 5,917,430 A | 6/1999 | Greneker, III et al. | |
| 5,920,278 A | 7/1999 | Tyler et al. | |
| 5,920,285 A | 7/1999 | Benjamin | |
| 5,931,893 A | 8/1999 | Dent et al. | |
| 5,959,571 A | 9/1999 | Aoyagi et al. | |
| 5,970,400 A | 10/1999 | Dwyer | |
| 6,048,315 A | 4/2000 | Chiao et al. | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,208,248 B1 | 3/2001 | Ross | |
| 6,288,672 B1 | 9/2001 | Asano et al. | |
| 6,307,622 B1 | 10/2001 | Lewis | |
| 6,335,700 B1 | 1/2002 | Ashihara | |
| 6,347,264 B2 | 2/2002 | Nicosia et al. | |
| 6,396,436 B1 | 5/2002 | Lissel et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,529,931 B1 | 3/2003 | Besz et al. | |
| 6,547,733 B2 | 4/2003 | Hwang et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,683,560 B2 | 1/2004 | Bauhahn | |
| 6,693,582 B2 | 2/2004 | Steinlechner et al. | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,867,732 B1 | 3/2005 | Chen et al. | |
| 6,888,491 B2 | 5/2005 | Richter | |
| 6,975,246 B1 | 12/2005 | Trudeau | |
| 7,066,886 B2 | 6/2006 | Song et al. | |
| 7,119,739 B1 | 10/2006 | Struckman | |
| 7,130,663 B2 | 10/2006 | Guo | |
| 7,202,776 B2 | 4/2007 | Breed | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 | 12/2008 | Nishijima et al. | |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,667,637 B2 | 2/2010 | Pedersen et al. | |
| 7,728,762 B2 | 6/2010 | Sakamoto | |
| 7,791,528 B2 | 9/2010 | Klotzbuecher | |
| 7,847,731 B2 | 12/2010 | Wiesbeck et al. | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,044,845 B2 | 10/2011 | Saunders | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,115,672 B2 | 2/2012 | Nouvel et al. | |
| 8,154,436 B2 | 4/2012 | Szajnowski | |
| 8,169,359 B2 | 5/2012 | Aoyagi | |
| 8,212,713 B2 | 7/2012 | Aiga et al. | |

(56) References Cited

U.S. PATENT DOCUMENTS

| | | |
|---|---|---|
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 8,768,248 B2 | 7/2014 | Sadr |
| 8,994,581 B1 | 3/2015 | Brown |
| 9,020,011 B1 | 4/2015 | Hiebert et al. |
| 9,063,225 B2 | 6/2015 | Lee et al. |
| 9,121,943 B2 | 9/2015 | Stirlin-Gallacher et al. |
| 9,182,479 B2 | 11/2015 | Chen et al. |
| 9,194,946 B1 | 11/2015 | Vacanti |
| 9,239,378 B2 | 1/2016 | Kishigami et al. |
| 9,239,379 B2 | 1/2016 | Burgio et al. |
| 9,274,217 B2 | 3/2016 | Chang et al. |
| 9,282,945 B2 | 3/2016 | Smith et al. |
| 9,335,402 B2 | 5/2016 | Maeno et al. |
| 9,400,328 B2 | 7/2016 | Hsiao et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,618,616 B2 | 4/2017 | Kishigami et al. |
| 9,689,967 B1* | 6/2017 | Stark ............... G01S 7/0233 |
| 9,709,674 B2 | 7/2017 | Moriuchi et al. |
| 9,720,073 B1 | 8/2017 | Davis et al. |
| 9,726,756 B2 | 8/2017 | Jansen |
| 9,720,080 B1 | 9/2017 | Rodenbeck |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 9,945,935 B2* | 4/2018 | Eshraghi ............ G01S 13/325 |
| 9,954,955 B2 | 4/2018 | Davis et al. |
| 9,971,020 B1 | 5/2018 | Maher et al. |
| 9,983,294 B2* | 5/2018 | Oshima ............... G01S 13/58 |
| 9,989,627 B2 | 6/2018 | Eshraghi et al. |
| 9,989,638 B2 | 6/2018 | Harris et al. |
| 10,073,171 B2* | 9/2018 | Bordes ............... G01S 13/50 |
| 10,090,585 B2 | 10/2018 | Dinc et al. |
| 10,092,192 B2 | 10/2018 | Lashkari et al. |
| 10,142,133 B2 | 11/2018 | Bordes et al. |
| 10,145,954 B2 | 12/2018 | Davis et al. |
| 10,191,142 B2 | 1/2019 | Eshraghi et al. |
| 10,197,671 B2 | 2/2019 | Alland et al. |
| 10,215,853 B2 | 2/2019 | Stark et al. |
| 10,261,179 B2 | 4/2019 | Davis et al. |
| 10,305,611 B1 | 5/2019 | Rimini et al. |
| 10,324,165 B2 | 6/2019 | Bordes et al. |
| 10,371,797 B1 | 8/2019 | Prados et al. |
| 10,386,470 B2 | 8/2019 | Zivkovic |
| 10,536,529 B2 | 1/2020 | Davis et al. |
| 10,551,482 B2 | 2/2020 | Eshraghi et al. |
| 10,573,959 B2 | 2/2020 | Alland et al. |
| 10,594,916 B2 | 3/2020 | Sivan |
| 10,605,894 B2 | 3/2020 | Davis et al. |
| 10,659,078 B2 | 5/2020 | Nayyar et al. |
| 10,670,695 B2 | 6/2020 | Maher et al. |
| 10,690,780 B1 | 6/2020 | Zarubica et al. |
| 10,775,478 B2 | 9/2020 | Davis et al. |
| 10,782,389 B2 | 9/2020 | Rao et al. |
| 10,805,933 B2 | 10/2020 | Stephens et al. |
| 10,812,985 B2 | 10/2020 | Mody et al. |
| 10,852,408 B2 | 12/2020 | Aslett et al. |
| 10,866,306 B2 | 12/2020 | Maher et al. |
| 10,908,272 B2 | 2/2021 | Rao et al. |
| 10,935,633 B2 | 3/2021 | Maher et al. |
| 10,976,431 B2 | 4/2021 | Harris et al. |
| 11,054,516 B2* | 7/2021 | Wu ..................... G01S 7/354 |
| 11,086,010 B2 | 8/2021 | Davis et al. |
| 11,105,890 B2 | 8/2021 | Behrens et al. |
| 11,175,377 B2 | 11/2021 | Bordes et al. |
| 11,194,016 B2* | 12/2021 | Eshraghi ............. G01S 13/87 |
| 11,262,448 B2 | 3/2022 | Davis et al. |
| 11,271,328 B2 | 3/2022 | Liu et al. |
| 11,340,331 B2 | 5/2022 | Maher et al. |
| 11,354,458 B1* | 6/2022 | Schwalb .............. G06N 3/006 |
| 11,454,697 B2 | 9/2022 | Maher et al. |
| 11,474,225 B2 | 10/2022 | Dent et al. |
| 11,582,305 B2 | 2/2023 | Davis et al. |
| 11,681,017 B2 | 6/2023 | Behrens et al. |
| 11,726,172 B2 | 8/2023 | Maher et al. |
| 11,740,323 B2 | 8/2023 | Davis et al. |
| 11,846,696 B2 | 12/2023 | Rao et al. |
| 11,899,133 B2* | 2/2024 | Sturm .................. G01S 7/415 |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0063653 A1 | 5/2002 | Oey et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0164791 A1 | 9/2003 | Shinoda et al. |
| 2003/0228890 A1 | 12/2003 | Falaki |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0070532 A1 | 4/2004 | Ishii et al. |
| 2004/0107030 A1 | 6/2004 | Nishira et al. |
| 2004/0130486 A1 | 7/2004 | Akopian |
| 2004/0138802 A1 | 7/2004 | Kuragaki et al. |
| 2004/0215373 A1 | 10/2004 | Won et al. |
| 2004/0229590 A1 | 11/2004 | Kubo et al. |
| 2005/0001757 A1 | 1/2005 | Shinoda et al. |
| 2005/0008065 A1 | 1/2005 | Schilling |
| 2005/0069162 A1 | 3/2005 | Haykin |
| 2005/0090274 A1 | 4/2005 | Miyashita |
| 2005/0100106 A1 | 5/2005 | Chen |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0220943 A1 | 10/2006 | Schlick et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0040729 A1 | 2/2007 | Ohnishi |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |

(56) References Cited

U.S. PATENT DOCUMENTS

| | | |
|---|---|---|
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0205937 A1 | 9/2007 | Thompson |
| 2007/0263748 A1 | 11/2007 | Mesecher |
| 2007/0279303 A1 | 12/2007 | Schoebel |
| 2008/0012710 A1 | 1/2008 | Sadr |
| 2008/0080599 A1 | 4/2008 | Kang et al. |
| 2008/0088499 A1 | 4/2008 | Bonthron |
| 2008/0094274 A1 | 4/2008 | Nakanishi |
| 2008/0106458 A1 | 5/2008 | Honda et al. |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0021429 A1 | 1/2009 | Colburn et al. |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0232510 A1 | 9/2009 | Gupta et al. |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0039313 A1 | 2/2010 | Morris |
| 2010/0075704 A1 | 3/2010 | McHenry et al. |
| 2010/0116365 A1 | 5/2010 | McCarty |
| 2010/0127916 A1 | 5/2010 | Sakai et al. |
| 2010/0156690 A1 | 6/2010 | Kim et al. |
| 2010/0166121 A1 | 7/2010 | Kenney, Jr. |
| 2010/0198513 A1 | 8/2010 | Zeng et al. |
| 2010/0202495 A1 | 8/2010 | Kagawa et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0234448 A1 | 9/2011 | Hayase |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050092 A1 | 3/2012 | Lee et al. |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0146834 A1 | 6/2012 | Karr |
| 2012/0173246 A1 | 7/2012 | Choi et al. |
| 2012/0194377 A1 | 8/2012 | Yukmatsu et al. |
| 2012/0195349 A1 | 8/2012 | Lakkis |
| 2012/0235857 A1 | 9/2012 | Kim et al. |
| 2012/0249356 A1 | 10/2012 | Shope |
| 2012/0257643 A1 | 10/2012 | Wu et al. |
| 2012/0283987 A1 | 11/2012 | Busking et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0129253 A1 | 5/2013 | Moate et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0194127 A1 | 8/2013 | Ishihara et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2013/0321198 A1* | 12/2013 | Park ............... G01S 13/878 342/175 |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0049423 A1 | 2/2014 | De Jong et al. |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0168004 A1 | 6/2014 | Chen et al. |
| 2014/0218240 A1 | 8/2014 | Kpodzo et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0316261 A1 | 10/2014 | Lux et al. |
| 2014/0327566 A1 | 11/2014 | Burgio et al. |
| 2014/0327570 A1 | 11/2014 | Beyer |
| 2014/0340254 A1 | 11/2014 | Hesse |
| 2014/0348253 A1 | 11/2014 | Mobasher et al. |
| 2014/0350815 A1 | 11/2014 | Kambe |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0153445 A1 | 6/2015 | Jansen |
| 2015/0160335 A1 | 6/2015 | Lynch et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226838 A1 | 8/2015 | Hayakawa |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0280893 A1 | 10/2015 | Choi et al. |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0333847 A1 | 11/2015 | Bharadia et al. |
| 2015/0346323 A1* | 12/2015 | Kollmer ............ G01S 7/4021 342/196 |
| 2015/0369912 A1 | 12/2015 | Kishigami et al. |
| 2015/0373167 A1 | 12/2015 | Murashov et al. |

(56) References Cited

U.S. PATENT DOCUMENTS

| | | |
|---|---|---|
| 2016/0003935 A1 | 1/2016 | Stainvas Olshansky et al. |
| 2016/0003938 A1 | 1/2016 | Gazit et al. |
| 2016/0003939 A1 | 1/2016 | Stainvas Olshansky et al. |
| 2016/0018511 A1* | 1/2016 | Nayyar .................. G01S 7/03 342/27 |
| 2016/0025844 A1 | 1/2016 | Mckitterick et al. |
| 2016/0033623 A1 | 2/2016 | Holder |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131742 A1 | 5/2016 | Schoor |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0157828 A1 | 6/2016 | Sumi et al. |
| 2016/0178732 A1 | 6/2016 | Oka et al. |
| 2016/0213258 A1 | 7/2016 | Lashkari et al. |
| 2016/0223643 A1 | 8/2016 | Li et al. |
| 2016/0223644 A1 | 8/2016 | Soga |
| 2016/0238694 A1 | 8/2016 | Kishigami |
| 2016/0245909 A1 | 8/2016 | Aslett et al. |
| 2016/0291130 A1 | 10/2016 | Ginsburg et al. |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0045608 A1 | 2/2017 | Mclean et al. |
| 2017/0074980 A1 | 3/2017 | Adib |
| 2017/0090015 A1 | 3/2017 | Breen et al. |
| 2017/0117946 A1 | 4/2017 | Lee et al. |
| 2017/0117950 A1 | 4/2017 | Strong |
| 2017/0153315 A1 | 6/2017 | Katayama |
| 2017/0153316 A1 | 6/2017 | Wintermantel |
| 2017/0176583 A1 | 6/2017 | Gulden et al. |
| 2017/0212213 A1 | 7/2017 | Kishigami |
| 2017/0219689 A1 | 8/2017 | Hung et al. |
| 2017/0223712 A1 | 8/2017 | Stephens et al. |
| 2017/0234968 A1 | 8/2017 | Roger et al. |
| 2017/0254879 A1 | 9/2017 | Tokieda, I et al. |
| 2017/0293027 A1* | 10/2017 | Stark .................. G01S 13/87 |
| 2017/0307728 A1 | 10/2017 | Eshraghi et al. |
| 2017/0307729 A1* | 10/2017 | Eshraghi .................. G01S 7/038 |
| 2017/0309997 A1 | 10/2017 | Alland et al. |
| 2017/0363731 A1* | 12/2017 | Bordes .................. G01S 7/354 |
| 2018/0003799 A1 | 1/2018 | Yang et al. |
| 2018/0019755 A1 | 1/2018 | Josefsberg et al. |
| 2018/0175907 A1 | 1/2018 | Marr |
| 2018/0031674 A1 | 2/2018 | Bordes et al. |
| 2018/0031675 A1 | 2/2018 | Eshraghi et al. |
| 2018/0074168 A1 | 3/2018 | Subburaj et al. |
| 2018/0095161 A1 | 4/2018 | Kellum et al. |
| 2018/0095163 A1 | 4/2018 | Lovberg et al. |
| 2018/0113191 A1 | 4/2018 | Villeval et al. |
| 2018/0115371 A1 | 4/2018 | Trotta et al. |
| 2018/0128913 A1 | 5/2018 | Bialer |
| 2018/0149730 A1 | 5/2018 | Li et al. |
| 2018/0149736 A1* | 5/2018 | Alland .................. H01Q 21/28 |
| 2018/0231636 A1* | 8/2018 | Maher .................. G01S 13/06 |
| 2018/0231655 A1* | 8/2018 | Stark .................. H04B 17/309 |
| 2018/0252809 A1* | 9/2018 | Davis .................. G01S 7/0233 |
| 2018/0259620 A1* | 9/2018 | Maher .................. G01S 13/06 |
| 2018/0271776 A1 | 9/2018 | Kazakevitch |
| 2018/0294564 A1 | 10/2018 | Kim |
| 2018/0294908 A1 | 10/2018 | Abdelmonem |
| 2018/0329027 A1 | 11/2018 | Eshraghi et al. |
| 2018/0358706 A1 | 12/2018 | Kildal et al. |
| 2018/0372837 A1 | 12/2018 | Bily et al. |
| 2018/0374346 A1 | 12/2018 | Fowe |
| 2019/0013566 A1 | 1/2019 | Merrell |
| 2019/0056476 A1 | 2/2019 | Lin |
| 2019/0064364 A1 | 2/2019 | Boysel et al. |
| 2019/0072641 A1 | 3/2019 | Al-Stouhi et al. |
| 2019/0129003 A1* | 5/2019 | Longman .................. G01S 7/35 |
| 2019/0146059 A1* | 5/2019 | Zanati .................. G01S 13/931 342/173 |
| 2019/0178983 A1 | 6/2019 | Lin et al. |
| 2019/0187245 A1 | 6/2019 | Guarin Aristizabal et al. |
| 2019/0219685 A1 | 7/2019 | Shan |
| 2019/0235050 A1 | 8/2019 | Maligeorgos et al. |
| 2019/0271776 A1* | 9/2019 | Davis .................. G01S 13/87 |
| 2019/0293755 A1 | 9/2019 | Cohen et al. |
| 2019/0324134 A1 | 10/2019 | Cattle |
| 2019/0377077 A1 | 12/2019 | Kitayama et al. |
| 2019/0379386 A1 | 12/2019 | Chi |
| 2019/0383901 A1* | 12/2019 | Elad .................. G01S 13/42 |
| 2019/0383929 A1 | 12/2019 | Melzer et al. |
| 2020/0003884 A1 | 1/2020 | Arkind et al. |
| 2020/0011983 A1 | 1/2020 | Kageme et al. |
| 2020/0014105 A1 | 1/2020 | Braun et al. |
| 2020/0033445 A1 | 1/2020 | Raphaeli et al. |
| 2020/0036487 A1 | 1/2020 | Hammond et al. |
| 2020/0064455 A1 | 2/2020 | Schroder et al. |
| 2020/0107249 A1 | 4/2020 | Stauffer et al. |
| 2020/0142049 A1 | 5/2020 | Solodky et al. |
| 2020/0158861 A1 | 5/2020 | Cattle et al. |
| 2020/0191939 A1 | 6/2020 | Wu et al. |
| 2020/0292666 A1 | 9/2020 | Maher et al. |
| 2020/0313719 A1 | 10/2020 | Blanchard et al. |
| 2020/0363499 A1* | 11/2020 | Mayer .................. G01S 13/87 |
| 2020/0393536 A1 | 12/2020 | Stettiner |
| 2021/0003664 A1* | 1/2021 | Davis .................. G01S 7/0234 |
| 2021/0181300 A1 | 6/2021 | Choi et al. |
| 2021/0190904 A1 | 6/2021 | Bourdoux et al. |
| 2021/0190905 A1 | 6/2021 | Roger et al. |
| 2021/0349201 A1* | 11/2021 | Trummer ............. G01S 7/0234 |
| 2021/0364634 A1 | 11/2021 | Davis et al. |
| 2021/0389414 A1 | 12/2021 | Behrens et al. |
| 2022/0291335 A1 | 9/2022 | Maher et al. |
| 2022/0350020 A1 | 11/2022 | Davis et al. |
| 2022/0365169 A1 | 11/2022 | Lefevre et al. |

FOREIGN PATENT DOCUMENTS

| | | | |
|---|---|---|---|
| EP | 0725480 | 11/2011 | |
| EP | 2374217 | 4/2013 | |
| EP | 2884299 | 6/2015 | |
| EP | 2821808 | 7/2015 | |
| EP | 3349038 | 7/2018 | |
| EP | 3062446 | 9/2018 | |
| EP | 3152956 | 3/2019 | |
| EP | 3483622 | 5/2019 | |
| EP | 3483622 A1 * | 5/2019 | ............. G01S 13/02 |
| EP | 3499264 | 1/2020 | |
| FR | 2751086 | 1/1998 | |
| GB | 2529029 | 2/2016 | |
| JP | 3625307 | 12/2004 | |
| JP | 2010243330 | 10/2010 | |
| KR | 101010522 | 1/2011 | |
| KR | 102088426 | 12/2020 | |
| WO | WO2008022981 | 2/2008 | |
| WO | WO2010/022156 | 2/2010 | |
| WO | WO2012115518 | 8/2012 | |
| WO | WO2013147948 | 10/2013 | |
| WO | WO2015175078 | 11/2015 | |
| WO | WO2015185058 | 12/2015 | |
| WO | WO2016011407 | 1/2016 | |
| WO | WO2016030656 | 3/2016 | |
| WO | WO2017187242 | 2/2017 | |
| WO | WO2017059961 | 4/2017 | |
| WO | WO2017175190 | 10/2017 | |
| WO | WO-2017187242 A1 * | 11/2017 | ............. G01S 13/18 |

(56) References Cited

FOREIGN PATENT DOCUMENTS

| WO | WO2017187330 | 11/2017 |
|---|---|---|
| WO | WO2020/259916 | 12/2020 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.

Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.

A. Bourdoux, U. Ahamd, D. Guermandi, S. Brebels, A. Dewilde, W. Van Thillo, PMCW "Waveform and MIMO Technique for a 79 GHz CMOS Automotive Radar", 2016 IEEE Radar Conference (RadarConf), 2016, pp. 1-5, doi: 10.1109/RADAR.2016.7485114. (Year: 2016).

V. Jain, F. Tzeng, L. Zhou and P. Heydari, "A single-Chip Dual-Band 22-29-GHz/77-81-GHz BiCMOS Transceiver for Automotive Radars," in IEEE Journal of Solid-State Circuits, vol. 44, No. 12, pp. 3469-3485, Dec. 2009, doi: 10.1109/JSSC.2009.2032583. (Year: 2009).

A. Medra et al., "An 80 GHz Low-Noise Amplifier Resilient to the TX Spillover in Phase-Modulated Continuous-Wave Radars," In IEEE Journal of Solid-State Circuits, vol. 51, No. 5, pp. 1141-1153, May 2016, doi: 10.1109/JSSC.2016.2520962. (Year: 2016).

B. P. Ginsburg et al., "A multimode 76-to-81Ghz automotive radar transceiver with autonomous monitoring," 2018 IEEE International Solid-State Circuits Conference—(ISSCC), 2018, pp. 158-160, doi: 10.1109/ISSCC.2018.8310232 (Year: 2018).

Y. Ma, C. Miao, Y. Zhao, and W. Wu, "An MIMO Radar System Based on the Sparse-Array and Its Frequency Migration Calibration Method", in MDPI Journal of Sensors, vol. 19, issue No. 16, Published Aug. 2019, doi: 10.3390/s19163580 (Year: 2019).

RadarRangeEquation2011.pdf from http://www.ece.uah.edu/courses/material/EE619-2011/RadarRangeEquation(2)2011.pdf (Year: 2011).

What are S-Parameters Everything RF.pdf from https://www.everythingrf.com/community/what-are-s-parameters (Year 2018).

* cited by examiner

METHOD AND SYSTEM FOR MULTI-CHIP OPERATION OF RADAR SYSTEMS

CROSS REFERENCE TO RELATED APPLICATIONS

The present application is a continuation of U.S. patent application Ser. No. 17/147,960, filed Jan. 13, 2021, which claims the filing benefits of U.S. provisional application, Ser. No. 62/960,220, filed Jan. 13, 2020, which are both hereby incorporated by reference herein in their entireties.

FIELD OF THE INVENTION

The present invention is directed to radar systems, and in particular to digital radar systems.

BACKGROUND OF THE INVENTION

The use of radar to determine location and velocity of objects in an environment is important in a number of applications including, for example, automotive radar, industrial processes, and gesture detection. A radar system typically transmits radio signals and listens for the reflection of the radio signals from objects in the environment. By comparing the transmitted radio signals with the received radio signals, a radar system can determine the distance to an object, and the velocity of the object. Using multiple transmitters and/or receivers, or a movable transmitter or receiver, the location (angle) of an object can also be determined.

A radar system consists of transmitters and receivers. The transmitters generate a baseband signal, which is up-converted to a radio frequency (RF) signal that propagates according to an antenna pattern. The transmitted signal is reflected off of objects or targets in the environment. The received signal at each receiver is the totality of the reflected signal from all targets in the environment. The receiver down-converts the received signal to baseband and compares the baseband received signal to the baseband signal at one or more transmitters. This is used to determine the range, velocity, and angle of targets in the environment.

A MIMO radar system includes a plurality of transmitters and a plurality of receivers. Each of the plurality of transmitters is coupled to a corresponding antenna, and each of the plurality of receivers is coupled to a corresponding antenna. The transmitter and receiver antennas are used to form a first set of virtual antenna locations. The more virtual antennas the better the angular resolution.

SUMMARY OF THE INVENTION

Methods and systems of the present invention provide for a radar using a plurality of radar chips (separate system-on-chip radars) so that they can be used together to improve performance and/or angular resolution (MIMO radar systems). In accordance with an embodiment of the present invention, the detection range (the range at which targets are detected) can be increased and the angular resolution (the minimum angle when two targets at the same range and Doppler can be separated) can be improved by increasing the number of transmitters or receivers or both in a radar system.

In one aspect of the present invention, multiple radar chips are connected to a centralized processing unit. Each radar chip is also connected to its own plurality of transmitter and receiver antennas. Each of the radar chips processes the data received on its receiver antennas to create a radar data cube for range, Doppler and virtual receiver. The virtual receiver information generated in each respective radar chip are based on all or a subset of the transmitters on all the radar chips. Each radar chip then passes their respective radar data cube information on a selected range and Doppler which are combined in the centralized processing unit to produce the final radar output in terms of range, Doppler, and angle (azimuth/elevation) of the detected targets.

In another aspect of the present invention, each of the radar chips are connected to multiple sets of transmitters and/or receivers via a switch. This allows Time Domain Multiplexing (TDM) operation across different transmit/receiver antenna sets connected to all the radar chips.

A multiple input, multiple output (MIMO) radar system on an integrated circuit chip in accordance with an embodiment of the present invention includes a plurality of circuit chips. A first plurality of transmitters and a first plurality of receivers are arranged on a first circuit chip of the plurality of circuit chips. A second plurality of transmitters and a second plurality of receivers are arranged on a second circuit chip of the plurality of circuit chips. The MIMO radar system includes a central processing unit configured to receive range, Doppler, and virtual receiver data from the first circuit chip and the second circuit chip. The first circuit chip and the second circuit chip are part of the integrated circuit chip.

A multiple input, multiple output (MIMO) radar system on an integrated circuit chip in accordance with an embodiment of the present invention includes a plurality of circuit chips, each configured as a radar chip. The plurality of circuit chips is part of the integrated circuit chip. A first circuit chip of the plurality of circuit chips comprises a first plurality of transmitters and a first plurality of receivers. A second circuit chip of the plurality of circuit chips comprises a second plurality of transmitters and a second plurality of receivers. The MIMO radar system includes a central processing unit configured to receive and process range, Doppler, and virtual receiver data from at least two circuit chips of the plurality of circuit chips.

In an aspect of the present invention, the transmitters and receivers of the circuit chips are coupled to respective antennas of an antenna array. The antenna array includes a receive antenna array and a transmit antenna array. Each antenna of the receive antenna array may have a same field of view defining an antenna directivity pattern. Each antenna of the transmit antenna array may have a same field of view defining an antenna directivity pattern.

In another aspect of the present invention, the central processing unit is operable to control the circuit chips.

In a further aspect of the present invention, the central processing unit is operable to request a subset of range, Doppler, and virtual receiver data collected and processed by at least two of the circuit chips of the plurality of circuit chips. The central processing unit is operable to combine the range, Doppler, and virtual receiver data received from the plurality of circuit chips. The central processing unit is operable to process the combined range, Doppler, and virtual receiver data.

In yet another aspect of the present invention, the central processing unit is operable to perform target detection and angle estimation for a target from the combined range, Doppler, and virtual receiver data. The central processing unit is also operable to perform angle estimation on the combined range, Doppler, and virtual receiver data using Fast Fourier Transform (FFT) on the virtual receiver data for a given range and Doppler.

DESCRIPTION OF THE PREFERRED EMBODIMENTS

Figure 1:
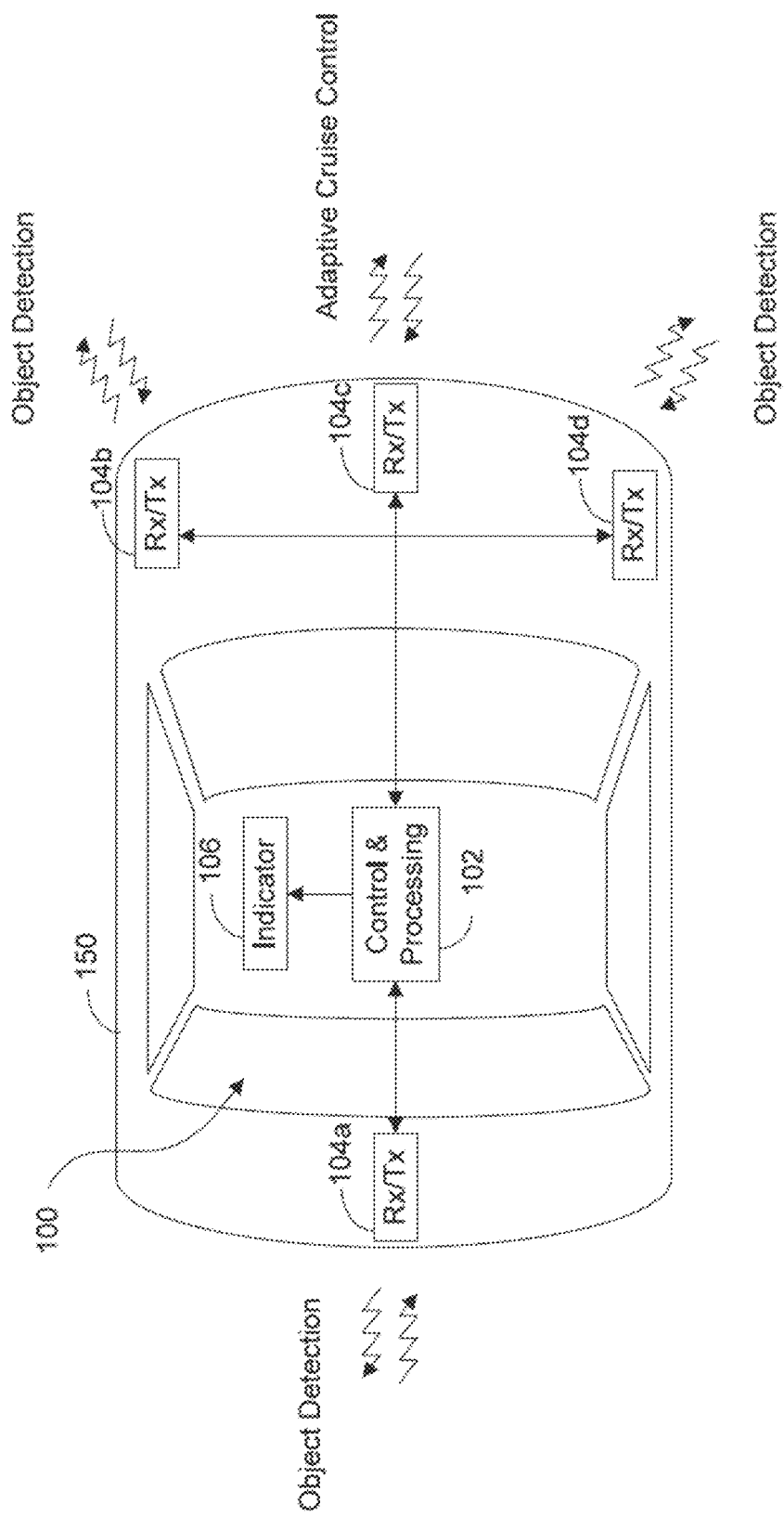
FIG. 1 is a plan view of an automobile equipped with a radar system in accordance with the present invention.

Referring to the drawings and the illustrative embodiments depicted therein, wherein numbered elements in the following written description correspond to like-numbered elements in the figures, an improved radar system utilizes multiple radar system-on-chips ("chip(s)"). A central processing unit of the radar system provides for the management a multi-chip MIMO radar system. The MIMO radar system includes a plurality of transmitters and a plurality of receivers on a plurality of radar chips. Each transmitter of the plurality of transmitters is coupled to a corresponding antenna, and each receiver of the plurality of receivers is coupled to a corresponding antenna. The transmitter and receiver antennas are used to form a set of virtual antenna locations (virtual receivers). The central processing unit is operable to control the plurality of radar chips, such that the plurality of radar chips may be adjusted to provide for at least one of virtual receiver scalability, range scalability, range bin scalability, and scalable angle performance.

FIG. 1 illustrates an exemplary radar system 100 configured for use in a vehicle 150. An exemplary vehicle 150 may be an automobile, truck, or bus, etc. The radar system 100 may utilize multiple radar systems (e.g., 104a-104d) embedded in the vehicle 150 (see FIG. 1). Each of these radar systems may employ multiple radar chips each with multiple transmitters, receivers, and antennas (see FIGS. 3 and 5). The transmitters of the radar system 100 transmit radio signals that are reflected from objects (also known as targets) in the environment and received by one or more receivers of the radar system 100. A transmitter-receiver pair is called a virtual radar (or sometimes a virtual receiver). As illustrated in FIG. 1, the radar system 100 may comprise one or more transmitters and one or more receivers (104a-104d) for a plurality of virtual radars. Other configurations are also possible. FIG. 1 illustrates the receivers/transmitters 104a-104d placed to acquire and provide data for object detection and adaptive cruise control. As illustrated in FIG. 1, a controller 102 receives and then analyzes position information received from the receivers 104a-104d and forwards processed information (e.g., position information) to, for example, an indicator 106 or other similar devices, as well as to other automotive systems. The radar system 100 (providing such object detection and adaptive cruise control or the like) may be part of an Advanced Driver Assistance System (ADAS) for the automobile 150.

An exemplary radar system operates by transmitting one or more signals from one or more transmitters and then listening for reflections of those signals from objects in the environment by one or more receivers. By comparing the transmitted signals and the received signals, estimates of the range, velocity, and angle (azimuth and/or elevation) of the objects can be estimated.

Figure 2B:
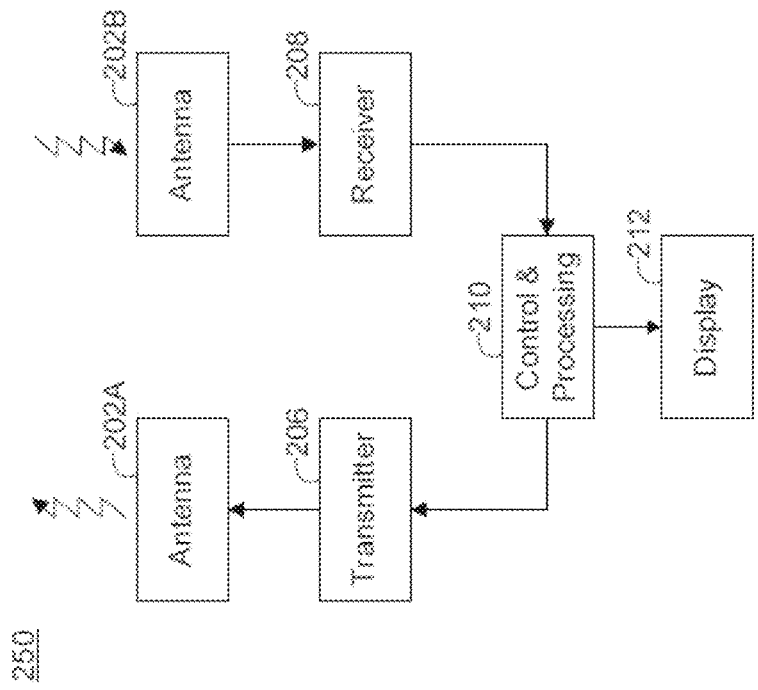
FIGS. 2A and 2B are block diagrams of radar systems in accordance with the present invention.
Figure 2A:
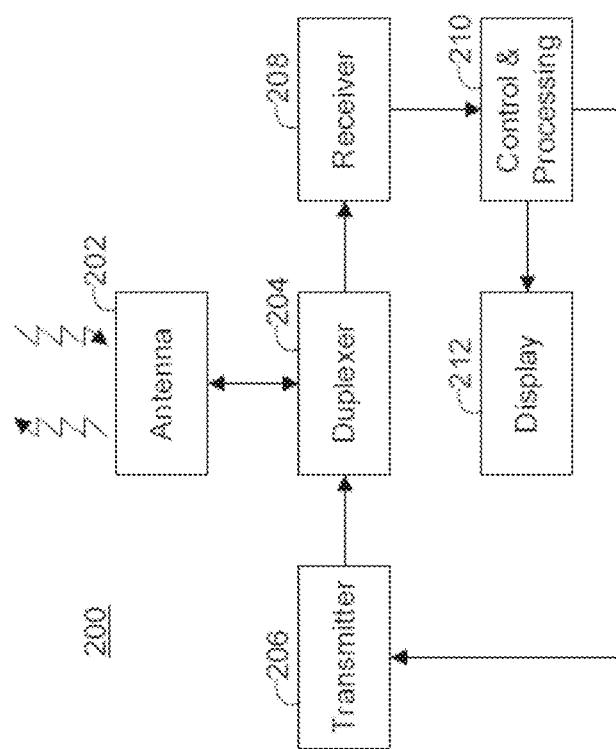

There are several ways to implement a radar system. One way, illustrated in FIG. 2A, uses a single antenna 202 for transmitting and receiving. The antenna 202 is connected to a duplexer 204 that routes the appropriate signal from the antenna 202 to a receiver 208 or routes the signal from a transmitter 206 to the antenna 202. A control processor 210 controls the operation of the transmitter 206 and the receiver 208 and estimates the range and velocity of objects in the environment. A second way to implement a radar system is shown in FIG. 2B. In this system, there are separate antennas for transmitting (202A) and receiving (202B). A control processor 210 performs the same basic functions as in FIG. 2A. In each case, there may be a display 212 to visualize the location of objects in the environment.

Figure 3:
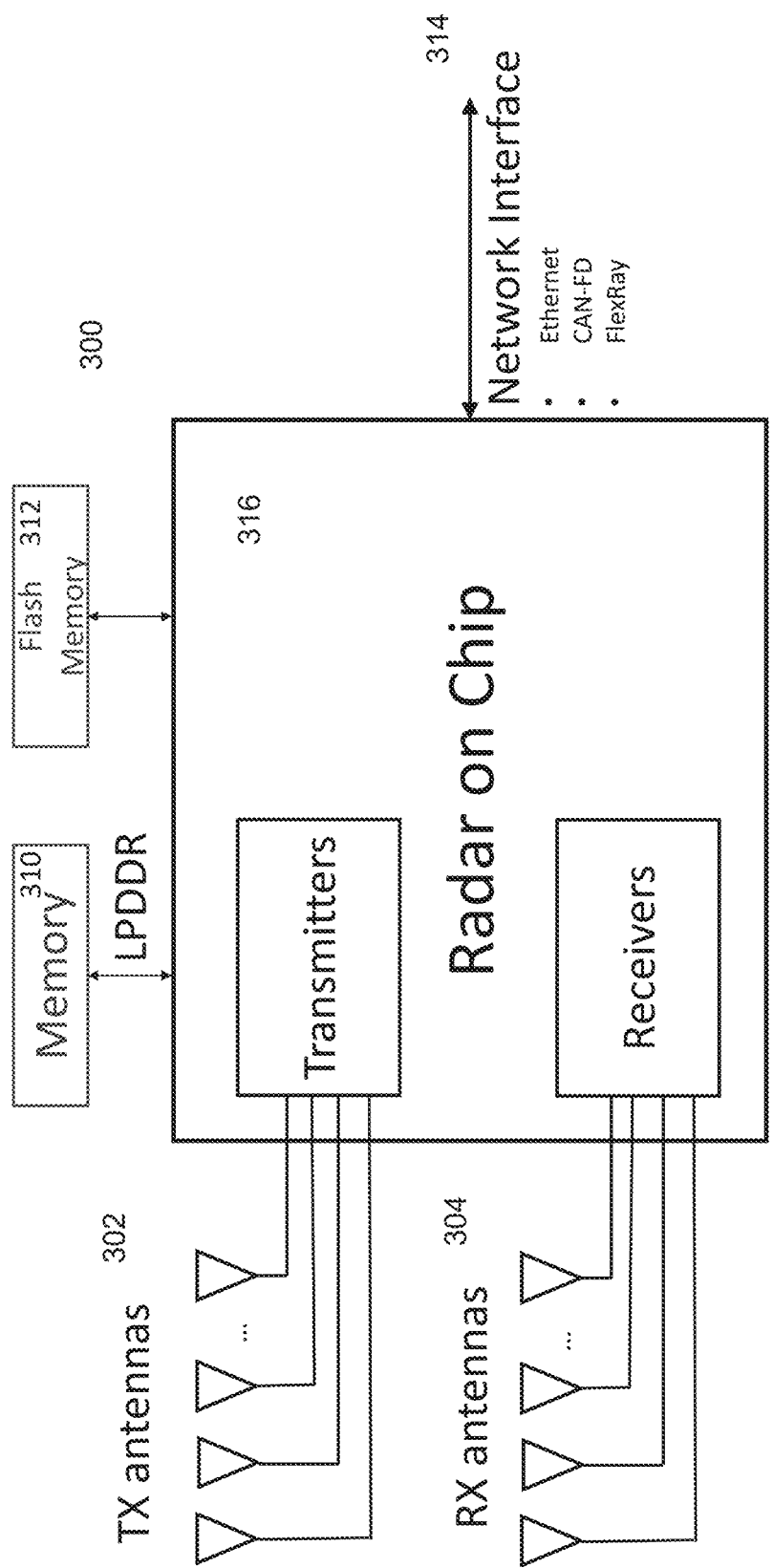
FIG. 3 is a block diagram illustrating a radar system using a single chip with a plurality of receivers and a plurality of transmitters in accordance with the present invention.

A radar system using a single chip with multiple antennas, transmitters, and receivers is shown in FIG. 3. Using multiple antennas 302, 304 allows an exemplary radar system 300 to determine the angle (azimuth or elevation or both) of targets in the environment. Depending on the geometry of the antenna system, different angles (e.g., azimuth or elevation) can be determined.

The radar system 300 may be connected to a network via an Ethernet connection or other types of network connections 314, such as, for example, CAN-FD and FlexRay. The radar system 300 may also have memory (310, 312) to store intermediate data and software used for processing the signals in order to determine range, velocity, and location of objects. Memory 310, 312 may also be used to store information about targets in the environment. There may also be processing capability contained in the application-specific integrated circuit (ASIC) 316 (henceforth called the "Radar on Chip" or simply "radar chip") apart from the transmitters 302 and receivers 304.

The description herein includes an exemplary radar system in which there are $N_T$ transmitters and $N_R$ receivers for $N_T \times N_R$ virtual radars, one for each transmitter-receiver pair. For example, a radar system with twelve transmitters and eight receivers will have 96 pairs or 96 virtual radars (with 96 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment (and thus, nine pairs or nine virtual radars).

There are several different types of signals that transmitters in radar systems employ. A radar system may transmit a pulsed signal or a continuous signal. In a pulsed radar system, the signal is transmitted for a short time and then no signal is transmitted. This is repeated over and over. When the signal is not being transmitted, the receiver listens for echoes or reflections from objects in the environment. Often a single antenna is used for both the transmitter and receiver and the radar transmits on the antenna and then listens to the received signal on the same antenna. This process is then repeated. In a continuous wave radar system, the signal is continuously transmitted. There may be an antenna for transmitting and a separate antenna for receiving.

Another classification of radar systems is the modulation of signal being transmitted. A first type of continuous wave radar signal is known as a frequency modulated continuous wave (FMCW) radar signal. In an FMCW radar system, the transmitted signal is a sinusoidal signal with a varying frequency. By measuring a time difference between when a certain frequency was transmitted and when the received signal contained that frequency, the range to an object can be determined. By measuring several different time differences between a transmitted signal and a received signal, velocity information can be obtained.

A second type of continuous wave signal used in radar systems is known as a phase modulated continuous wave (PMCW) radar signal. In a PMCW radar system, the transmitted signal from a single transmitter is a sinusoidal signal in which the phase of the sinusoidal signal varies. Typically, the phase during a given time period (called a chip period or chip duration) is one of a finite number of possible phases. A spreading code consisting of a sequence of chips, (e.g., +1, +1, −1, +1, −1 . . . ) is mapped (e.g., +1→0, −1→p) into a sequence of phases (e.g., 0, 0, p, 0, p . . . ) that is used to modulate a carrier to generate the radio frequency (RF) signal. The spreading code could be a periodic sequence or could be a pseudo-random sequence with a very large period, so it appears to be a nearly random sequence. The spreading code could be a binary code (e.g., +1 or −1). The resulting signal has a bandwidth that is proportional to the rate at which the phases change, called the chip rate $f_{chip}$, which is the inverse of the chip duration, $T_{chip}=1/f_{chip}$. In a PMCW radar system, the receiver typically performs correlations of the received signal with time-delayed versions of the transmitted signal and looks for peaks in the correlation as a function of the time-delay, also known as correlation lag. The correlation lag of the transmitted signal that yields a peak in the correlation corresponds to the delay of the transmitted signal when reflected off an object. The round-trip distance to the object is found by multiplying that delay (correlation lag) by the speed of light.

In some radar systems, the signal (e.g. a PMCW signal) is transmitted over a short time period (e.g. 1 microsecond) and then turned off for a similar time period. The receiver is only turned on during the time period where the transmitter is turned off. In this approach, reflections of the transmitted signal from very close targets will not be completely available because the receiver is not active during a large fraction of the time when the reflected signals are being received. This is called pulse mode.

Digital frequency modulated continuous wave (FMCW) and phase modulated continuous wave (PMCW) are techniques in which a carrier signal is frequency or phase modulated, respectively, with digital codes using, for example, GMSK. Digital FMCW/PMCW radar lends itself to be constructed in a MIMO variant in which multiple transmitters transmitting multiple codes are received by multiple receivers that decode all codes. The advantage of the MIMO digital FMCW/PMCW radar is that the angular resolution is that of a virtual antenna array having an equivalent number of elements equal to the product of the number of transmitters and the number of receivers. Digital FMCW/PMCW MIMO radar techniques are described in U.S. Pat. Nos. 9,989,627; 9,945,935; 9,846,228; and 9,791,551, which are all hereby incorporated by reference herein in their entireties.

Embodiments of the radar sensing system may utilize aspects of the radar systems described in U.S. Pat. Nos. 10,261,179; 9,971,020; 9,954,955; 9,945,935; 9,869,762; 9,846,228; 9,806,914; 9,791,564; 9,791,551; 9,772,397; 9,753,121; 9,689,967; 9,599,702; 9,575,160, and/or 9,689,967, and/or U.S. Publication Nos. US-2017-0309997; and/or U.S. patent application Ser. No. 16/674,543, filed Nov. 5, 2019, Ser. No. 16/259,474, filed Jan. 28, 2019, Ser. No. 16/220,121, filed Dec. 14, 2018, Ser. No. 15/496,038, filed Apr. 25, 2017, Ser. No. 15/689,273, filed Aug. 29, 2017, Ser. No. 15/893,021, filed Feb. 9, 2018, and/or Ser. No. 15/892,865, filed Feb. 9, 2018, and/or U.S. provisional application, Ser. No. 62/816,941, filed Mar. 12, 2019, which are all hereby incorporated by reference herein in their entireties.

Figure 4:
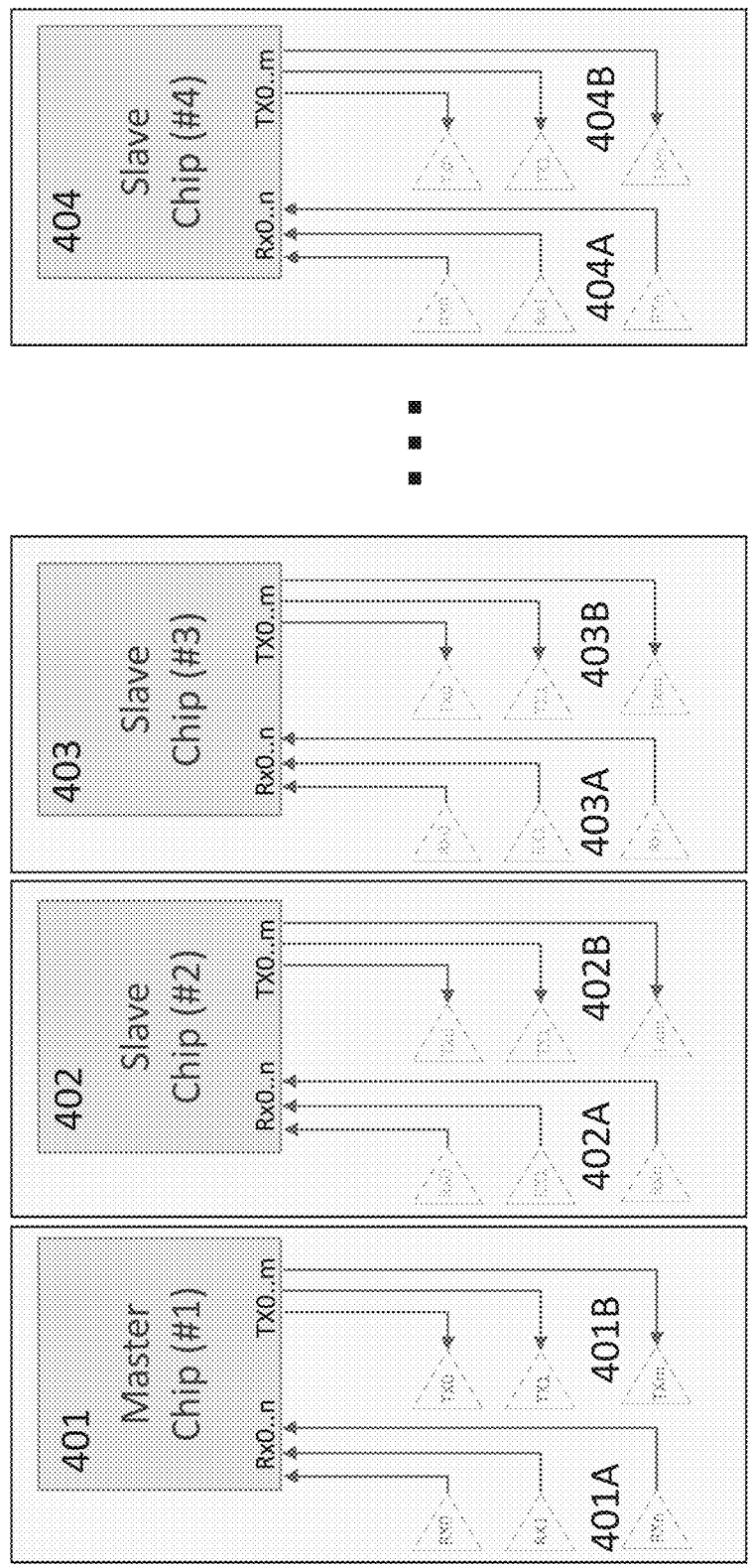
FIG. 4 is a block diagram illustrating a radar system with multiple chips, each with a respective plurality of receivers and a plurality of transmitters of its own in accordance with the present invention.

Multi-Chip Radar Systems:

Embodiments discussed herein utilize an exemplary method for incorporating a plurality of radar chips or ASICs into a single radar system to improve detection range and angular resolution performance. FIG. 4 shows an exemplary radar system 400 using a plurality of radar chips 401, 402, 403, and 404 (which could also be described as 40*n*). One of the chips 401 is considered as master and the other chips 402, 403 and 404 are slaves. The (m+1) transmitters (numbered 0 . . . m) of each of the chips are connected to (m+1) individual antennas. For example, chip 401 is connected to (m+1) transmit antennas 401A, chip 402 is connected to transmit antennas 402A and so on. Similarly, the (n+1) receivers (numbered 0 . . . n) of each of the chips are connected to (n+1) individual antennas. For example, chip 401 is connected to (n+1) receive antennas 401B, chip 402 is connected to receive antennas 402B and so on. The plurality of radar chips 401, 402, 403, and 404 in the radar system 400 needs to be synchronized. Synchronization techniques across a plurality of radar chips are described in U.S. patent publication No. 2020/0292666, which is hereby incorporated by reference herein in its entirety.

Figure 5:
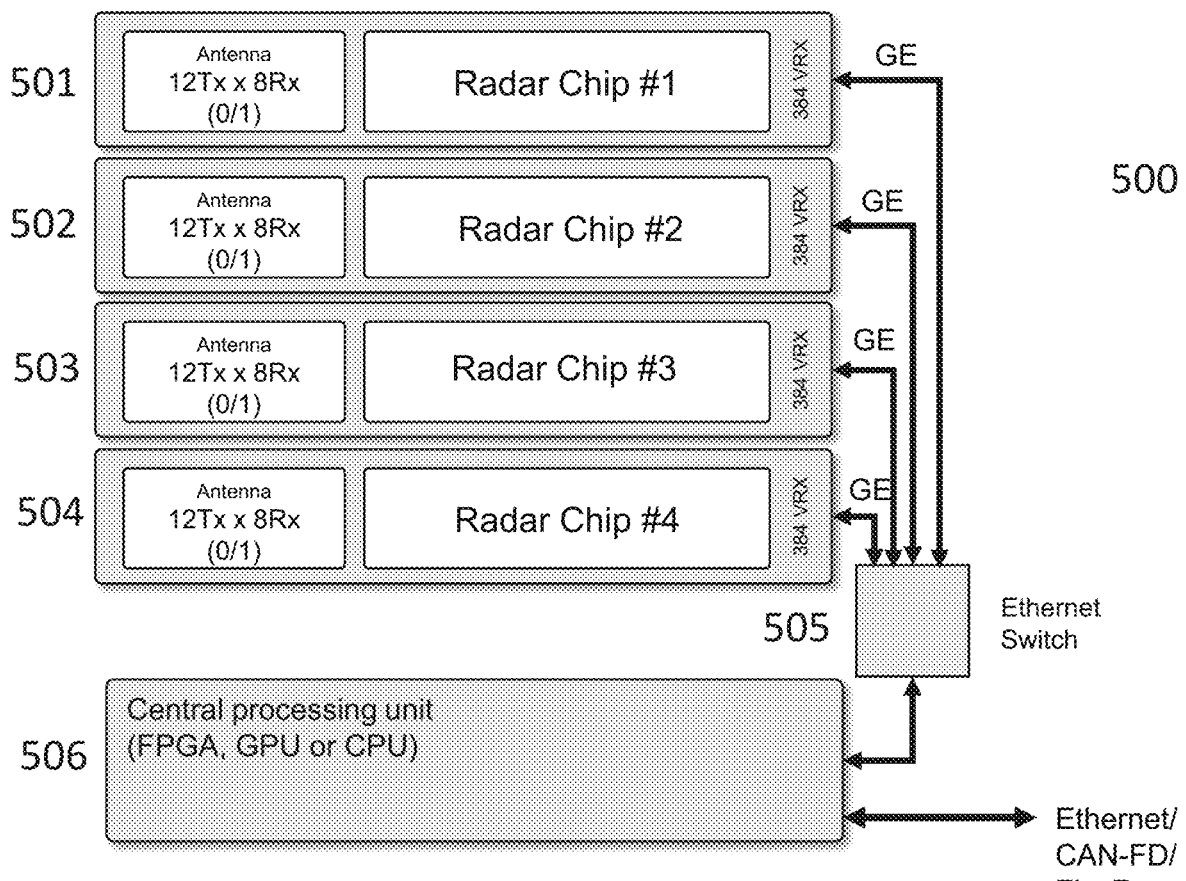
FIG. 5 is a block diagram of a radar system with a plurality of radar chips each with a respective plurality of receivers and a plurality of transmitters of its own and connected to a centralized processor in accordance with the present invention.

We now describe the exemplary implementation illustrated in FIG. 5. The system 500 uses an exemplary four (4) radar chips 501, 502, 503, and 504 (each with their own antenna array) connected to a central processor 506. Each individual radar chip 501, 502, 503, and 504 with its own plurality of transmit and receive antennas constitutes a radar sub-system 501, 502, 503 and 504. As illustrated in FIG. 5 radar sub-system 501 uses radar chip #1, radar sub-system 502 radar chip #2 and so on. The radar chips 501, 502, 503, and 504 are connected to an Ethernet switch 505 using Gigabit Ethernet (GE). The switch 505 is connected to the central processing unit 506. The individual radar chip (501, 502, 503, and 504) thus communicates with the central processing unit 506 using Gigabit Ethernet via an Ethernet Switch 505. The output of the central processing unit 506 is available through Ethernet or CAN-FD or FlexRay depending on overall system configuration. FIG. 5 shows an exemplary case where each radar chip 501, 502, 503 and 504 is connected to two sets of RX antennas (each set containing 8 receive antennas) via 8 individual RF switches. The switches are incorporated inside the individual radar chips 501, 502, 503 and 504. The two sets are numbered 0/1 in FIG. 5.

Figure 6:
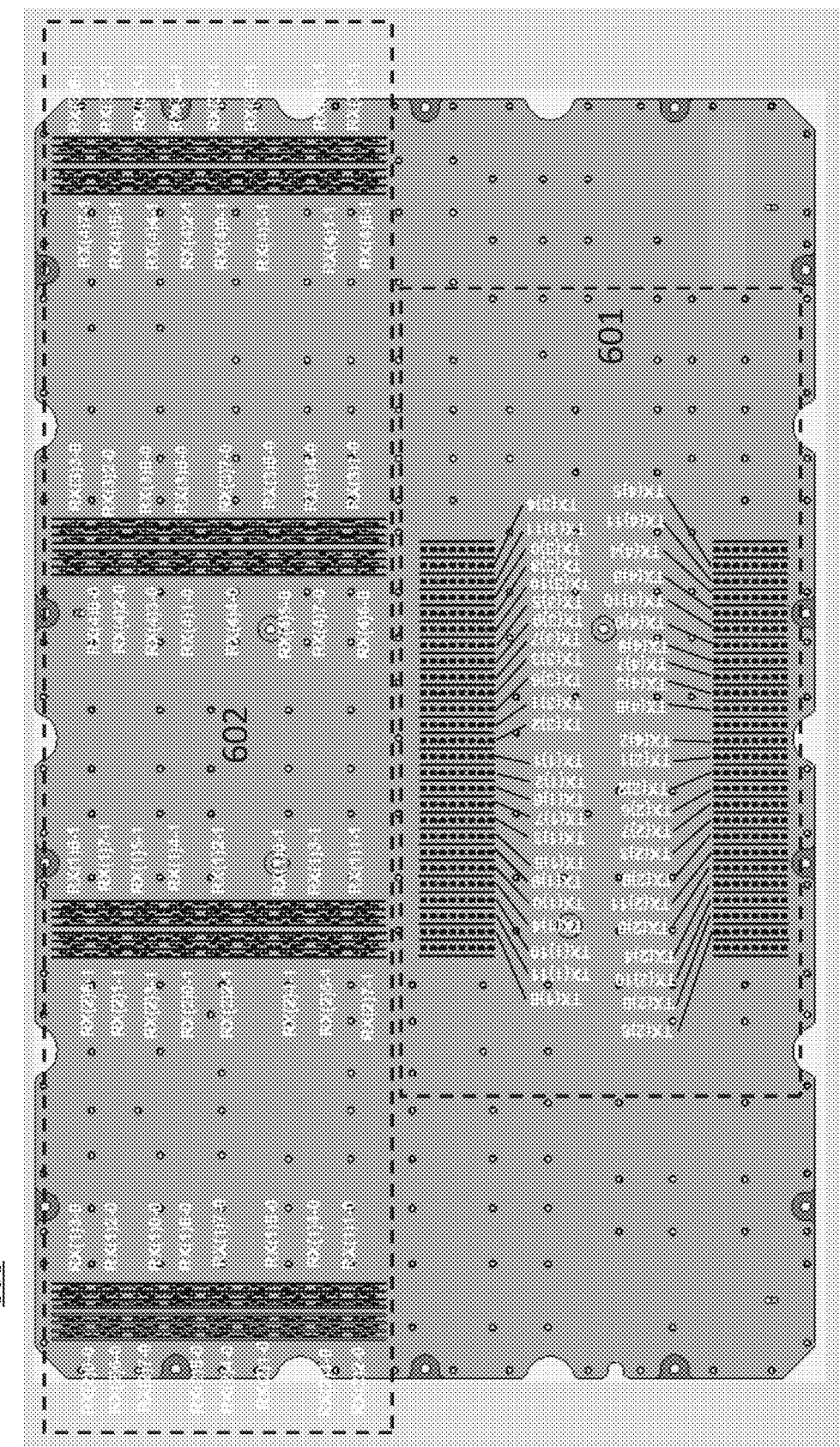
FIG. 6 shows an exemplary structure of an antenna system in accordance with the present invention.

FIG. 6 shows the structure of an exemplary antenna array 600 that can be used by the radar system 500 in FIG. 5. Antenna array 601 constitutes the transmit antenna array. There are 4×12=48 transmit antennas (12 antennas per radar chip) in this exemplary implementation. The numbering TX(p)q indicates that it is the qth antenna (q=0, 1, . . . 11) connected to the pth chip. Similarly, antenna array 602 constitutes the receive antenna array where the antenna numbered RX(p)q-r indicates that it is the qth antenna (q=0, 1, . . . 7) connected to rth switch of the pth chip. There are a total of 2 (number of switches)×4 (number of chip)×8 (number of receivers per chip per switch)=64 receive antennas in this exemplary implementation.

If only one switch is used, we have 48 transmitters and 32 receivers providing the capability to have 1536 virtual receivers in such a system. If two switches are used as shown, the system is capable of 3072 virtual receivers. In the exemplary case where both the switches are used, the system switches to the first 1536 virtual receivers for a prescribed period of time and then switches to the second 1536 virtual receivers for a second prescribed period of time and then alternates between the two virtual receiver sets, staying on each for its prescribed period of time.

Figure 7:
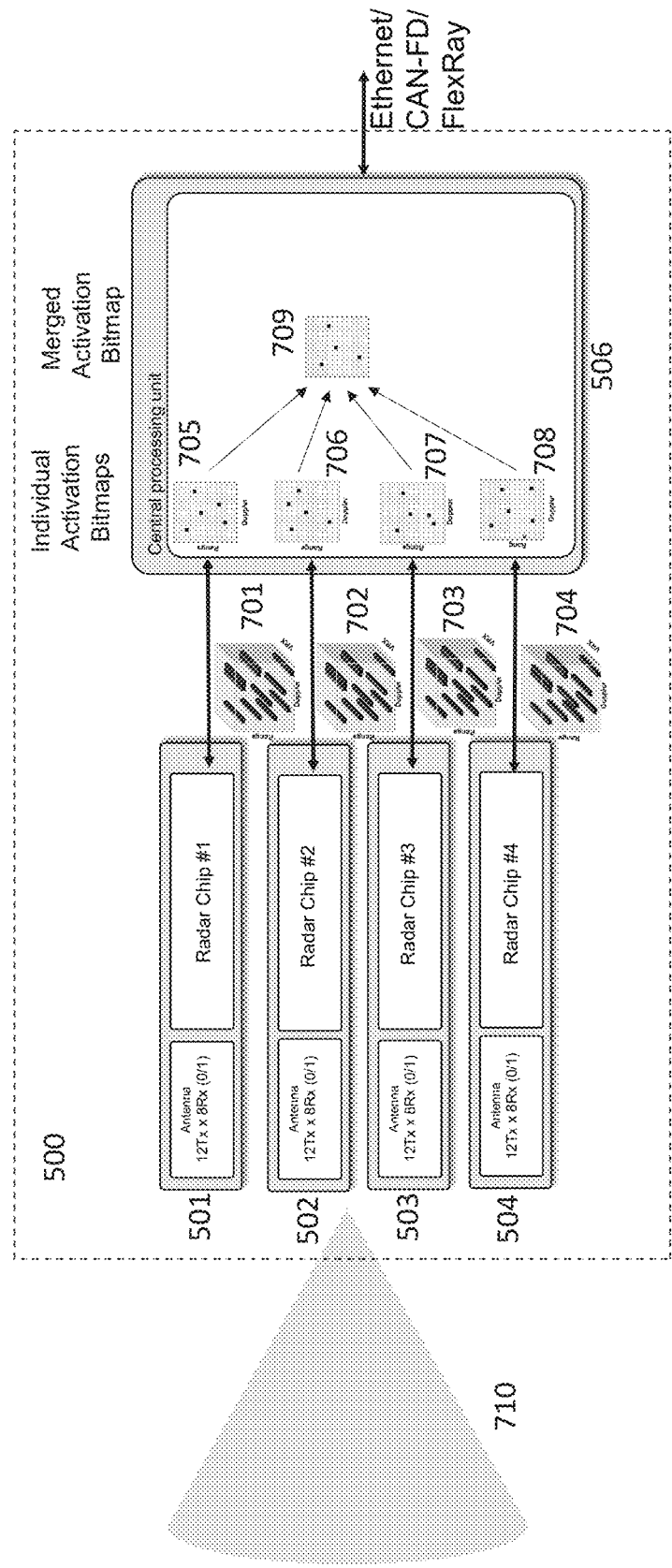
FIG. 7 is a block diagram of a radar system in FIG. 5 showing how the data is generated in each radar chip and then combined in the centralized processor in accordance with the present invention.

FIG. 7 gives another view of the system described in FIG. 5. FIG. 5 shows an exemplary Field of View (FoV) 710 of the radar systems 501, 502, 503 and 504. Each individual transmit antenna element in the transmit array in FIG. 6 should have the same FoV (or antenna directivity pattern). Similarly, individual receive antenna elements in the receive array in FIG. 6 should have the same FoV. This ensures that the all the virtual antenna elements in the array have the same FoV.

Each individual radar chip (501, 502, 503 and 504) functions as a sub-system whose purpose is to convert the signal arriving at the plurality of the receive antennas connected to the particular chip into range/Doppler data per virtual receivers comprising the receive antennas connected to the particular radar chip and all or a subset of the transmit antennas in the overall radar system 500. The individual chips 501, 502, 503 and 504 also select a subset of the range/Doppler data that it forwards to the central processing unit 506. The subset selection is known as activations. These activations are shown in dark colored skewers in the range/Doppler/virtual receiver (VRX) data cubes 701, 702, 703, and 704 in FIG. 7. A bit map (705, 706, 707, and 708) showing which range/Doppler data has been forwarded is also sent to the central processing unit 506. In the exemplary implementation in FIG. 7, sub-system 501 (radar chip #1 with its connected receive antenna) generates the activations 701 and bitmaps 705, sub-system 502 generates activations 702 and bitmap 706 and so on. This down-selection of range/Doppler also serves to reduce the bandwidth of data to be transferred between each individual radar chip 501, 502, 503 and 504 and the central processing unit 506. The central processing unit 506 combines the activation bit maps 705, 706, 707, and 708 into a single merged bit map 709 indicating the range/Doppler data that will be further processed in the central processing unit 506. The merging can simply be the intersection of the individual bitmaps (meaning the merged bit map will have valid values only if there is a valid value in all the individual bitmaps for a given range/Doppler). The central processing unit 506 then performs target detection as well as angle (azimuth/elevation) estimation for the target from the range, Doppler, and virtual receivers (across all radar chips 501, 502, 503 and 504 in the system 500)

In one exemplary implementation, angle estimation can be done using Fast Fourier Transform (FFT) on the virtual receiver data for a given range and Doppler. In another implementation, a sub-space based method like the well-known MUSIC (Multiple Signal Classification) can be used for angle estimation.

Target detection can be performed by a threshold test where values above a threshold are declared as targets. The threshold can be locally adjusted based on Constant False Alarm Rate (CFAR) criteria.

Figure 8:
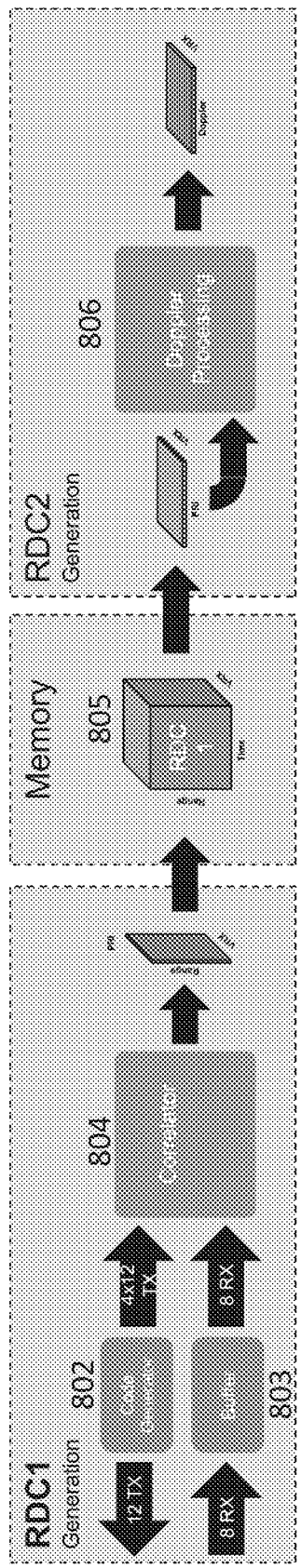
FIG. 8 shows part of the processing blocks for each radar chip to generate range and Doppler information across the virtual receivers in accordance with the present invention.
Figure 9:
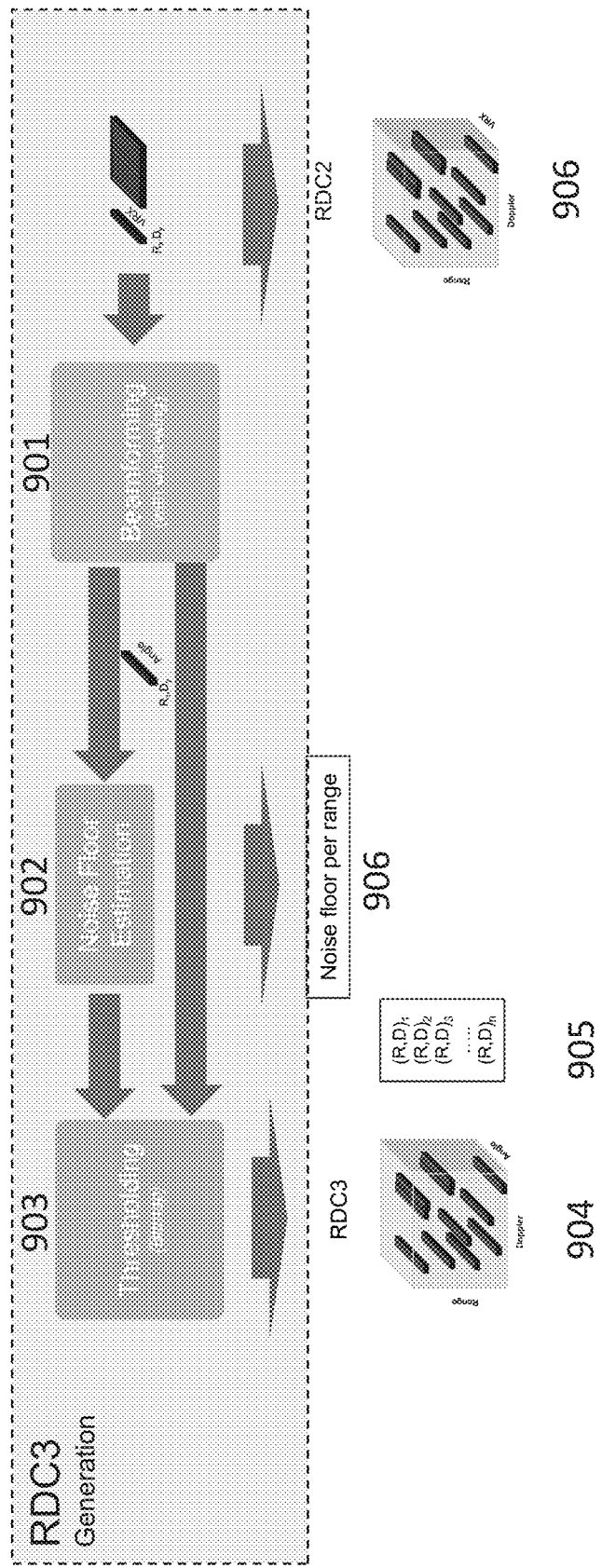
FIG. 9 shows the rest of the processing blocks for each radar chip to generate the range and Doppler map to send to the centralized processor along with the corresponding sparsified range, Doppler, and virtual receiver data cube in accordance with the present invention.

We now describe an exemplary method of creating the activations (701, 702, 703, and 704) and the corresponding bitmap (705, 706, 707, and 708) in each individual radar chip 501, 502, 503, and 504 with reference to FIGS. 8 and 9. FIG. 8 shows the method of converting the incoming data in the receivers for the given radar chip into range, Doppler and virtual receiver data. This data is often referred to as RDC2 (Radar Data Cube #2). As mentioned earlier, in an exemplary implementation, a corresponding spreading code (modulation) is transmitted by each transmitter. Different spreading codes are transmitted simultaneously on the different antennas. In the implementation shown in FIG. 5, each radar chip has 12 transmitters transmitting 12 different spreading codes. The multi-chip radar system has four (4) radar chips with a total of 48 transmitters transmitting 48 different spreading codes. The 48 codes are known to all of the radar chips 501, 502, 503 and 504, or can be generated in the code generator unit 802 inside each of the radar chips 501, 502, 503 and 504. Code generator 802 generates all the 48 codes (thus, each radar chip generates all 48 codes). Each radar chip (501, 502, 503, and 504) transmits its own 12 codes on the 12 transmitters connected to its own chip. The data from the 8 receivers (on the own chip) are collected into a buffer 803 and then forwarded to the correlator unit 804. The correlator unit 804 correlates each of the 8 receiver data with the 48 spreading codes thereby generating 48×8=384 virtual receiver data. The time spent for each correlation is known as a Pulse Repetition Interval (PRI). The correlator unit 804 converts the received data across its 8 receivers into range, PRI and virtual receiver data commonly referred to as RDC1 (Radar Data Cube #1) 805 is saved in memory. The RDC1 data is then converted into RDC2 data (a second radar data cube) using the Doppler processing unit 806. The Doppler processing unit 806 simply performs an FFT or an IFFT (Inverse FFT) operation over the number of PRI (commonly called Coherent Processing Interval or CPI) over which the RDC1 data is collected.

Referring to FIG. 9, the RDC2 data is then converted into the RDC3 (Radar Data Cube #3) which represents range, Doppler and angle data. This is done using the beamforming unit 901. In one exemplary embodiment, the beamforming unit 901 performs a matrix multiplication using the steering vectors for the desired angles. In another embodiment, the beamforming unit 901 performs a Fast Fourier Transform. As opposed to the final angle estimation performed in the central processing unit 506 in FIG. 5, the beamforming performed in the beamforming unit 901 is based on the virtual receivers available only to a given radar chip. As such, this does not have the range detection or the angular resolution performance of the overall system. The main purpose of performing a beamforming at this stage is to decide the subset (activations) of range/Doppler data in RDC2 that will be forwarded to the central processing unit 506 for final processing. The RDC3 output of the beamforming unit 901 is used in noise floor estimation unit 902. In our exemplary implementation, a per-range histogram is used to estimate the per-range noise floor. For a given range/Doppler, whenever any magnitude across the angle data exceeds the noise floor above a given threshold, that range/Doppler data is "activated," meaning this range/Doppler belongs to the subset of RDC2 data that will be forwarded to the central processing unit 506. The list 905 represents the activated range/Doppler values that will constitute the valid values in the range/Doppler activation bitmap (705, 706, . . . 708 in FIG. 7). The corresponding RDC2 activations (shown in dark skewers in 906) are then forwarded to the central processing unit 506. They represent the items 701, 706, . . . 708 in FIG. 7. Each sub-system may also forward the estimated noise floor per range 906 as well as the activated RDC3 data 904.

In one exemplary implementation using the Time Domain Multiplexing (TDM) approach with the two virtual antenna array sets (0/1) in the system, illustrated in FIG. 5, the antenna switching occurs at the PRI boundary. Referring to FIGS. 8 and 9, there is no change in RDC1 processing. However, the Doppler processing (processing unit 806 in FIG. 8) and subsequent beamforming, noise estimation, and thresholding operations (processing units 901, 902, 903 in FIG. 9, respectively) are carried out only across PRIs for the same antenna array. The output provided to the central processing unit 506 is then multiple sets of range/Doppler RDC2 activations and the corresponding bitmaps-one per virtual antenna array set within a given CPI.

In another implementation using the TDM approach, the antenna switching occurs at the CPI boundary. In this case, there is no essential change in the processing described in FIGS. 8 and 9. There is a single set of range/Doppler RDC2 activations and its bitmap per CPI. However, the virtual receiver set that this set of activation values belongs to alternates with the CPI.

In another embodiment of the TDM approach, the central processing unit 506 combines the data from the two virtual array sets into a larger virtual array to perform target detection and angle of arrival estimation.

Thus, a MIMO radar system may include a plurality of circuit chips, with each circuit chip configured as a radar chip, and with each radar chip comprising a plurality of transmitters and a plurality of receivers. The MIMO radar system includes a central processing unit configured to receive and process range, Doppler, and virtual receiver data received from at least two radar chips of the plurality of radar chips. In processing the range, Doppler, and virtual receiver data received from the plurality of radar chips, the central processing unit is operable to use the plurality of radar chips to provide for at least one of: virtual receiver scalability, range scalability, range bin scalability, and scalable angle performance.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A multiple input, multiple output (MIMO) radar system comprising:
a first plurality of transmitters and a first plurality of receivers arranged on a first circuit chip, wherein the transmitters and receivers of the first circuit chip are configured to perform selected range, Doppler, and virtual receiver processing on a first set of data, and wherein the transmitters and receivers of the first circuit chip are configured to select a first subset of data from the first set of data; and
a second plurality of transmitters and a second plurality of receivers arranged on a second circuit chip, wherein the transmitters and receivers of the second circuit chip are configured to perform selected range, Doppler, and virtual receiver processing on a second set of data, and wherein the transmitters and receivers of the first circuit chip are configured to select a second subset of data from the second set of data;
wherein the first circuit chip is configured to perform the selected range, Doppler, and virtual receiver processing independent of the second circuit chip; and
wherein a processor is configured to receive the first and second subsets of data and perform target detection and angle estimation using the first and second subsets of data, and wherein the resulting target detection and angle estimation produced by the processor comprises a higher range detection and/or angular resolution performance as compared to any respective target detection and angle estimation performed by the transmitters and receivers of the respective first and second circuit chips.

2. The MIMO radar system of claim 1, wherein the first circuit chip and the second circuit chip are each separate system-on-chip radar systems.

3. The MIMO radar system of claim 1, wherein the first circuit chip and the second circuit are arranged on an integrated circuit chip.

4. The MIMO radar system of claim 1, wherein the processor is configured to receive range, Doppler, and virtual receiver data from at least one of the first circuit chip and the second circuit chip.

5. The MIMO radar system of claim 4, wherein the first circuit chip, the second circuit chip, and the processor are arranged on an integrated circuit chip.

6. The MIMO radar system of claim 4, wherein the processor is configured to control the first circuit chip and the second circuit chip.

7. The MIMO radar system of claim 4, wherein the processor is operable to control the transmitters and receivers of the first circuit chip and the second circuit chip, such that a selected arrangement of transmitters and/or receivers from the respective first circuit chip and the second circuit chip are used to realize a selected detection range and/or Doppler resolution.

8. The MIMO radar system of claim 7, wherein the first circuit chip and the second circuit chip comprise a plurality of switches configured to select between receiver antennas such that the first circuit chip and the second circuit chip are each configured to select a respective receiver antenna arrangement.

9. The MIMO radar system of claim 4 further comprising an Ethernet network switch configured to communicatively couple the first circuit chip and the second circuit chip to the processor.

10. The MIMO radar system of claim 4, wherein the processor is a central processing unit configured to perform target detection and/or angle estimation for a target based upon the selected range, Doppler, and virtual receiver processing from the first circuit chip and/or the second circuit chip.

11. The MIMO radar system of claim 10, wherein the selected range, Doppler, and virtual receiver processing from the first circuit chip and/or the second circuit chip are intermediate processing results, and wherein the processor is configured to perform final processing based upon the intermediate processing results to perform target detection and angle estimation.

12. A multiple input, multiple output (MIMO) radar system comprising:
a plurality of circuit chips, each configured as a separate system-on-chip radar system;
wherein a first circuit chip of the plurality of circuit chips comprises a first plurality of transmitters and a first plurality of receivers arranged on the first circuit chip, wherein the transmitters and receivers of the first circuit chip are configured to produce a first set of selected range, Doppler, and virtual receiver data;
wherein a second circuit chip of the plurality of circuit chips comprises a second plurality of transmitters and a second plurality of receivers arranged on the second circuit chip, wherein the transmitters and receivers of the second circuit chip are configured to produce a second set of selected range, Doppler, and virtual receiver data; and
a processor configured to receive the first and/or second set of selected range, Doppler, and virtual receiver data from the respective first circuit chip and/or second circuit chip, wherein the processor is further configured to perform target detection and angle estimation;
wherein the first circuit chip is configured to perform the selected range, Doppler, and virtual receiver processing independent of the second circuit chip; and
wherein the first and second circuit chips are configured to perform respective selected target detection and angle estimation to produce the first and second sets of selected range, Doppler, and virtual receiver data, and wherein the selected target detection and angle estimation of the first and second circuit chips comprises a lower range detection and/or angular resolution performance as compared to the target detection and angle estimation of the processor.

13. The radar system of claim 12 further comprising an integrated circuit chip, wherein the first circuit chip and the second circuit chip are arranged on the integrated circuit chip.

14. The radar system of claim 13, wherein the first circuit chip, the second circuit chip, and the processor are arranged on the integrated circuit chip.

15. The radar system of claim 12, wherein the processor is configured to control the first circuit chip and the second circuit chip.

16. The radar system of claim 12, wherein the first circuit chip is configured to select a subset of range, Doppler, and virtual receiver data produced by the transmitters and receivers of the first circuit chip to produce the first set of selected range, Doppler, and virtual receiver data, and wherein the second circuit chip is configured to select a subset of range, Doppler, and virtual receiver data produced by the transmitters and receivers of the second circuit chip to produce the second set of selected range, Doppler, and virtual receiver data.

17. The radar system of claim 16, wherein the processor is configured to perform target detection and angle estimation from the first and second sets of selected range, Doppler, and virtual receiver data, and wherein the angle estimation comprises azimuth estimation and elevation estimation for the detected target.

18. The radar system of claim 16, wherein the first and second circuit chips are configured to generate respective virtual receiver arrays, wherein the processor is configured to generate a combined virtual array comprising the virtual receiver arrays of the first and second circuit chips, and wherein the processor is configured to perform target detection and angle of arrival estimation based upon the combined virtual array.

19. The radar system of claim 16, wherein the processor is configured to use the first and second sets of selected range, Doppler, and virtual receiver data to produce at least one of virtual receiver scalability, range scalability, range bin scalability, and scalable angle performance.

* * * * *